US006847296B2

United States Patent
Wenzel et al.

(10) Patent No.: US 6,847,296 B2
(45) Date of Patent: Jan. 25, 2005

(54) METHOD AND DEVICE FOR LOCATING MOVING OBJECTS

(75) Inventors: Dirk Wenzel, Hamburg (DE); Wolfgang Tobergte, Halstenbek (DE); Holger Kunkat, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/262,385

(22) Filed: Oct. 1, 2002

(65) Prior Publication Data

US 2003/0076239 A1 Apr. 24, 2003

(30) Foreign Application Priority Data

Oct. 4, 2001 (DE) .......................................... 101 48 919

(51) Int. Cl.$^7$ ................................................. H04Q 7/00
(52) U.S. Cl. ..................................... 340/539.21; 342/33
(58) Field of Search ....................... 340/539.21, 539.22; 375/134, 140; 342/33, 36, 40

(56) References Cited

U.S. PATENT DOCUMENTS

| | | | | |
|---|---|---|---|---|
| 4,647,205 A | * | 3/1987 | Kalliomaki et al. | ........ 356/503 |
| 5,699,151 A | * | 12/1997 | Akasu | ........ 356/5.01 |
| 5,920,278 A | * | 7/1999 | Tyler et al. | .......... 342/33 |
| 6,157,300 A | | 12/2000 | Quaderer et al. | ........ 340/572.1 |
| 6,188,715 B1 | * | 2/2001 | Partyka | .......... 375/134 |

* cited by examiner

*Primary Examiner*—John Tweel
(74) *Attorney, Agent, or Firm*—Kevin Simons

(57) ABSTRACT

In order to provide a method for locating moving objects that will allow high precision in position determination and thus largely eliminate sorting errors, and also to provide a device suitable for executing the method, it is envisaged that on at least one defined location within the reading range of an interrogator (16) arranged in a stationary position, an interference pulse, which influences a response signal transmitted by a transponder (20) carried by a moving object (12) in response to a signal transmitted by the interrogator (16), is exerted on the object (12), and a position of the object (12) is determined in dependence on a time when the influence of the response signal occurred.

15 Claims, 1 Drawing Sheet

METHOD AND DEVICE FOR LOCATING MOVING OBJECTS

BACKGROUND OF THE INVENTION

1. Field of the Invention

The invention relates to a method and a device for locating moving objects, having the characteristic features of the preamble of claim 1 or of claim 10. The invention further relates to applications of the method or the device.

2. Description of Related Art

For locating moving objects, arrangement of so-called transponders on the objects is known, these transponders being able to communicate with an interrogator arranged in a stationary position on a path of movement of the object. Here, transponders, chip cards and labels are grouped under the term transponder (often also called "tag") within the scope of the present invention. The interrogator is a transceiver facility with at least one antenna, which transmits an electromagnetic signal or field within a reading range. As soon as the object with the associated transponder comes into the reading range of the interrogator and an antenna of the transponder receives the electromagnetic signal transmitted by the interrogator, a transmitter of the transponder is stimulated to emit a response signal. This in turn is detected, decoded and converted by a receiver of the interrogator. Usually the response signal from the transponder is a signal modulated with the interrogator's transmitted signal according to a mathematical relation. In applications where, in addition to simple position determination for the moving objects, an identification and subsequent sorting of the objects is also required, superposing the response signal on information personalizing the transponder is also known. In this way the interrogator receives information not only about the positions of the objects, but also about their individual order.

A problem with this method is that the transponder's response signal is dependent on an individual response sensitivity and a spatial orientation of the transponder relative to the interrogator antenna. This makes the locating of the transponder and/or the objects imprecise. This effect can lead to objects close beside one another not getting resolution, so that their order is incorrectly detected and sorting errors then follow.

A first approach to solving this problem involves evaluating the amplitude of the reverse modulated response signal from the transponder. For this, the peak value of an amplitude characteristic is usually assigned to the spatial center of the interrogator antenna's reading range. However, since depending on the transponder's orientation the amplitude peak value need not necessarily match the spatial center of the interrogator's reading range, this too can lead to imprecise position determination and sorting errors. For this reason it is not possible to distinguish transponders closely following one another.

BRIEF SUMMARY OF THE INVENTION

The present invention is therefore based on the object of providing a method for locating moving objects that permits high precision in position determination and thereby largely eliminates sorting errors. A device suitable for executing the method is further supplied.

According to the invention this object is achieved with a method having the characteristic features as claimed in claim 1 and a device as claimed in claim 10. Since an interference pulse influencing the transponder's response signal is exerted on at least one defined location within the interrogator's reading range, and a position of the object is determined in dependence on a time when the influence of the response signal occurs, the precision of locating is clearly increased compared to known methods. Within the interrogator's reading range, the interference pulse to be defined later in more detail marks a location that can be correlated with great precision with the occurrence of a disturbance of the transponder's response signal, in particular an erratic discontinuity of the response signal. In other words, it may be assumed with great reliability that at the time at which the influence of the response signal is detected by the interrogator, the transponder or the object concerned is at the defined location of the disturbance. In this way even objects close beside one another can be detected and sorted with sufficient precision.

According to an advantageous embodiment of the invention, the interference pulse is a mechanical pulse, which causes an interference movement of the object superposing the movement of the object. For example, within the object's path of movement, and in particular within a conveyor belt, a step can be arranged that causes a tilting movement of the object and the transponder, thereby briefly altering an orientation of the transponder in relation to the interrogator. Since the transponder's response signal, particularly its amplitude, depends on the transponder's orientation, the object's interference movement developed here as a tilting movement causes a discontinuity in the characteristic of the amplitude of the response signal. The mechanically caused interference movement can likewise be a turn and/or a change in direction of the object, which is effected by corresponding turning or direction-changing arrangements disposed within a conveyor section. Alternatively or additionally, the interference movement can also be a vibration of the object, caused by a mechanical shaking of the object occurring at the location of the disturbance and/or by an acoustic sound acting on the object.

In an alternative advantageous embodiment of the invention, the interference pulse influences the electromagnetic field and/or a resonant frequency of the transponder at the defined location (location of the disturbance) within the interrogator's reading range. Accordingly, the interference pulse can for example be a local change of temperature, a magnetic influence exerted by a correspondingly arranged metal, a shielding measure or field routing measure affecting the electromagnetic field and/or a change of a dielectric constant and/or permeability of a surrounding medium or similar.

A further advantageous embodiment provides that the transponder's response signal contains information personalizing the transponder. This can be provided in particular in the form of a transponder-specific carrier frequency. The provision of such personalizing information is always necessary when the objects should not only be located, but also identified and sorted.

The method according to the invention and the device according to the invention can be used especially advantageously for locating and sorting objects on conveyor belts. In particular, items of luggage on conveyor belts in airports or packages on assembly lines can be located, and sorted and transported on to their individual destinations. The method is further suitable for locating and/or sorting moving objects on assembly lines in production processes.

Further preferred embodiments of the invention arise from the other features cited in the dependent claims.

BRIEF DESCRIPTION OF THE DRAWINGS

The invention will be further described with reference to examples of embodiments shown in the drawings to which, however, the invention is not restricted, in which.

DETAILED DESCRIPTION

Figure 1:
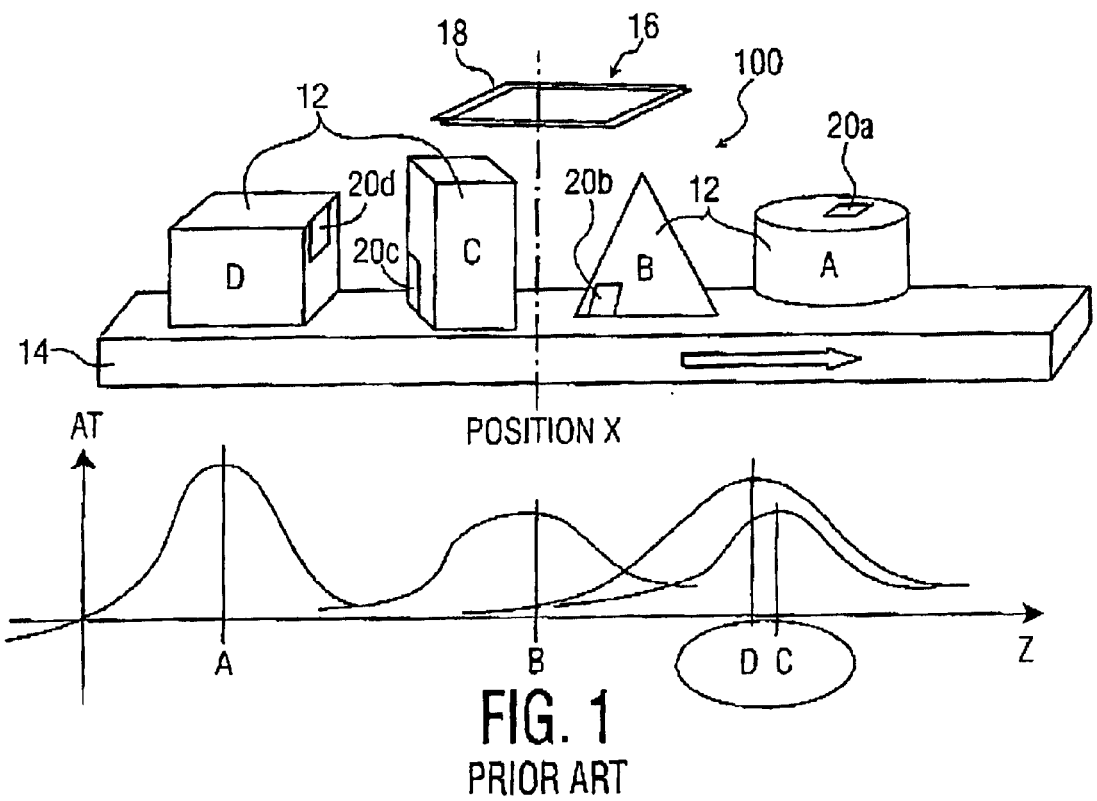
FIG. 1 shows a device and a method for locating moving objects according to the prior art.

FIG. 1 shows in the upper part of the diagram a number of differently shaped and oriented objects 12, which are moved on a conveyor belt 14 in the direction of the arrow. A device for locating the moving objects 12 is marked altogether as 100. The device 100 includes an interrogator 16 arranged in a stationary position, being essentially a transceiver facility. Shown here is just one antenna 18 of the interrogator 16, which serves for transmitting and receiving an electromagnetic signal or field. Different from the representation, several differently arranged interrogator antennas 18 can also be provided. The device 100 further includes transponders 20, of which at least one is arranged on each object 12.

The interrogator 16 or the antenna 18 transmits a transmit signal, in particular a high-frequency signal, within a reading range, which essentially extends vertically below the area bounded by the antenna 18. As soon as a transponder 20 of an object 12 enters the reading range of the interrogator 16, the transmit signal is received by an antenna, not further shown, of the transponder 20, whereupon a transmitter, not shown either, of the transponder 20 transmits a response signal modulated with the transmitted signal. This response signal can advantageously contain transponder-specific information, in particular in the form of an individual carrier frequency, which enables identification of the different objects 12. An evaluation facility assigned to the interrogator 16, and not shown, processes the received response signal, for instance in order to appropriately drive sorting facilities (not shown) on the output side of the conveyor belt 14.

Only position determination for the objects 12, which is often inadequate, is possible with this known arrangement. This problem is explained in the lower part of FIG. 1 with the help of time curves of the response signals reverse-modulated by the transponders 20. The amplitude curve of the response signals from the transponders 20 over time Z is shown. The amplitude AT of a transponder response signal depends both on the distance of the transponder 20 from the interrogator antenna 18 and also on the spatial orientation of the transponder 20 relative to the antenna 18. It depends primarily on a size of an area of the transponder 20 projected orthogonally on to the area of the antenna 18. The nearer the transponder 20 is to the antenna 18, and the larger the area of the transponder 20 "seen" by the antenna 18, the greater is the amplitude of the transponder response signal.

In the example shown, the object A goes first through the reading range of the interrogator antenna 18. Since the transponder 20a of the object A is on the side of the object turned towards the interrogator 16 and is thus relatively near to the antenna 18, and the transponder 20a is facing the antenna 18 with its biggest possible area, the individual amplitude curve associated with the object A shows a relatively high intensity and also a symmetrical pattern. The response signal characteristic of the transponder 20a is evaluated by the evaluation unit of the interrogator 16, a maximum of the amplitude curve usually being assigned to the spatial center of the interrogator antenna. Because of the optimal spatial orientation of the transponder 20a of object A, precise locating is possible here without problems.

In contrast, because of the oblique orientation of the corresponding transponder 20b to the antenna 18, the amplitude curve for the reverse modulated response signal of the tetrahedral object B shows an asymmetrical and wide pattern. This makes the position determination of object B with the help of the maximum value of the amplitude curve considerably less reliable. Nevertheless, because of the sizeable distance from the transponder 20b of the object B to the neighboring transponders 20a and 20c, an accurate determination of the order is achieved.

Determining the position and order of the objects C and D becomes problematic: their transponders 20c and 20d are arranged in close succession, and in addition are unfavorably aligned relative to the antenna 18. The transponder 20c of object C, which comes into the reading range of the interrogator 16 before object D, is not "seen" at first by the antenna 18, since the body of the object C shields the electromagnetic field of the reading range. Conversely, the transponder 20d of the object D is already stimulated and detected by the antenna 18 at a time when the object D itself is still essentially outside the reading range. Consequently, the maximum amplitude of the transponder 20d is determined before the maximum of the transponder 20c. The objects C and D are therefore detected in reverse order as a consequence, and then incorrectly sorted.

Figure 2:
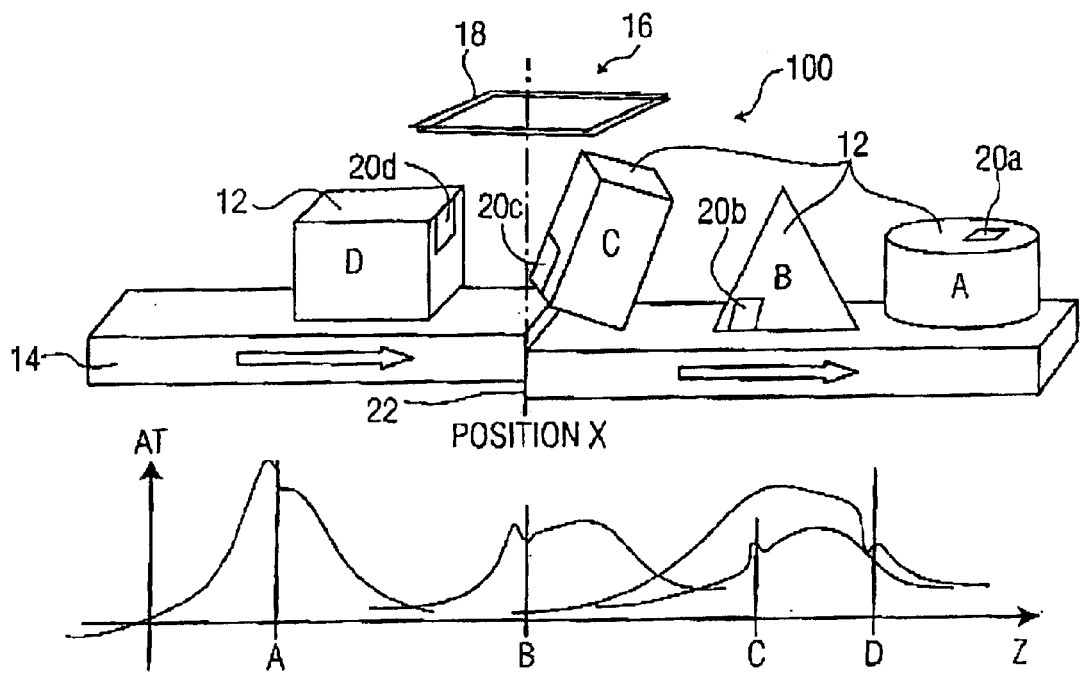
FIG. 2 shows a device and a method for locating moving objects according to an advantageous embodiment of the invention.

This problem is solved with a device shown in FIG. 2 according to the invention. The same reference labels are used in FIG. 2 for the same elements as in FIG. 1, and not explained once more. The device 100 according to the invention for locating moving objects 12 includes, as well as the interrogator 16 and the transponders 20, an interference generator 22, which is arranged at a defined location at position X within the reading range of the interrogator 16 and exerts an interference pulse on the object 12, so that the response signal of the transponder 20 is influenced.

In the example shown, the interference generator 22 exerts a mechanical interference pulse on the object 12 and is developed as a step at position X of the conveyor belt 14 or as an offset in height between two successively arranged conveyor belts 14. An object 12, which is being moved over the step 22, executes a tilting movement at a certain time, at which an overweight occurs of an overhanging extent of the object 12 over the step 22 (see object C in FIG. 2). This tilting movement causes a change in the distance of the transponder 20 arranged on the object 12 from the interrogator antenna 18, as well as its spatial orientation. As a result, the reverse modulated amplitude of the response signal changes erratically at precisely this time. This discontinuous irregularity in the amplitude characteristic noticeably superposes the continuous customary pattern caused by the linear movement of the conveyor belt 14 (see lower part, FIG. 2). According to the invention, with the help of customary mathematical algorithms the irregularity in each individual amplitude curve of the individual transponders 20 is now determined and the time of occurrence of the irregularity is correlated with the position X of the step 22. In other words it is assumed that at the time when the irregularity occurs in the response signal of the transponder 20, the associated object 12 has its spatial center at the position X.

As can be recognized especially from the amplitude curves of the response signals of transponders 20c and 20d of objects C and D, a correct determination of position and order is also achieved for objects 12 whose transponders 20 are arranged close to one another. According to the principle, no minimum distance need be provided between neighboring transponders 20. In this way a higher capacity level can be achieved for example in the case of assembly lines in production plants. It should also be stressed that even unintended field disturbances do not impair the reliability of the method according to the invention, as these equally affect all transponders 20 and are thus recognizable.

The principle of the interference pulse for simplifying locating according to the invention was explained in this case with the example of a mechanical interference pulse brought about by a step. It is understood, however, that mechanical interference pulses can also be generated in other ways, and that it is further possible to exert non-mechanical interference pulses too, which influence the electromagnetic field and/or the transponders' resonant frequency at a defined position X within the reading range of the interrogator. Such interference pulses were already explained in the foregoing text. In any case, the interference pulse will influence the transponder's response signal erratically and thus enable precise position determination for the associated object.

Reference Label List:

100 device for locating moving objects
12 object
14 conveyor belt
16 interrogator
18 interrogator antenna
20 transponder
22 interference generator/step

What is claimed is:

1. A method for locating moving objects, at least one interrogator (16) arranged in a stationary position relative to a path of movement of the object (12), transmitting an electromagnetic signal within a reading range, the moving object (12) carrying at least one transponder (20) which transmits a response signal in response to the transmitted signal, and the interrogator (16) receiving and evaluating the response signal, characterized in that on at least one defined location within the interrogator's (16) reading range an interference pulse influencing the transponder's (20) response signal is exerted, and a position is determined for the object (12) dependent on a time when the influence of the response signal occurred.

2. A method as claimed in claim 1, characterized in that the interference pulse is a mechanical pulse, which causes an interference movement of the object (12) superposing the movement of the object (12).

3. A method as claimed in claim 2, characterized in that the interference movement is a tilting movement caused by a step arranged within the path of movement and/or a turn and/or change in direction of the object (12) and/or a vibration of the object (12) caused by a mechanical shaking and/or by an acoustic sound effect.

4. A method as claimed in claim 1, characterized in that the interference pulse causes an influence of an electromagnetic field at the defined location within the reading range and/or of a resonant frequency of the transponder (20).

5. A method as claimed in claim 4, characterized in that the interference pulse is a temperature change, a magnetic influence exerted by an arranged material, a shielding measure, a field routing measure, a change to a dielectric constant of a surrounding medium and/or a change to a permeability of the surrounding medium.

6. A method as claimed in claim 1, characterized in that the interrogator (16) and/or the transponder (20) each include at least one antenna for transmitting and receiving electromagnetic signals, especially high-frequency signals.

7. A method as claimed in claim 1, characterized in that the transponder's (20) response signal contains information personalizing the transponder (20).

8. A method as claimed in claim 1, characterized in that an amplitude of the response signal is evaluated.

9. A method as claimed in claim 1, characterized in that the influence on the response signal caused by the interference signal is an erratic discontinuity especially of the amplitude of the signal.

10. A device (100) for locating moving objects (12) with at least one interrogator (16) arranged in a stationary position relative to a path of movement of the object (12), transmitting an electromagnetic signal within a reading range, to at least one transponder (20) assigned to the moving object (12), this transponder transmitting a response signal in response to the transmitted signal; and with an evaluation unit which evaluates the response signal from the transponder (20) received by the interrogator (16), characterized in that at at least one defined location within the reading range of the interrogator (16) an interference generator (22) is arranged, which exerts an interference pulse on the object (12), influencing the response signal of the transponder (20).

11. A device as claimed in claim 10, characterized in that the interference generator (22) exerts a mechanical pulse, which causes an interference movement of the object (12) superposing the movement of the object (12).

12. A device as claimed in claim 11, characterized in that the interference generator (22) is a step arranged within the path of movement and/or a turning facility and/or a direction-changing facility, and/or is a device that causes a mechanical and/or acoustic shaking of the object (12).

13. A device as claimed in claim 10, characterized in that the interference generator (22) is a facility causing an influence on the electromagnetic field at the defined location and/or on a transponder resonant frequency.

14. A device as claimed in claim 10, characterized in that the evaluation unit is assigned to the interrogator (16).

15. Implementation of a method as claimed in claim 1, for locating and/or sorting objects on conveyor belts, especially items of luggage on luggage conveyors at airports or packages on assembly lines, or for locating moving objects in production processes.

* * * * *